United States Patent [19]
Fukui et al.

[11] Patent Number: 5,635,439
[45] Date of Patent: Jun. 3, 1997

[54] CATALYST FOR METHANOL REFORMING, PROCESS FOR PRODUCING THE SAME AND METHOD FOR REFORMING METHANOL

[75] Inventors: Hideo Fukui, Sendai; Tsuyoshi Masumoto, 3-8-22, Kamisugi, Aoba-ku, Sendai-shi,Miyagi; Akihisa Inoue, 11-806, Kawauchijutaku,Mubanchi,Kawauchi, Aoba-ku, Sendai-shi, Miyagi; Hisamichi Kimura, Aza-tobeihashi; Katsutoshi Nosaki, Toda, all of Japan

[73] Assignees: Tsuyoshi Masumoto, Miyagi; Akihisa Inoue, Miyagi-Ken; Honda Giken Kogyo Kabushiki Kaisha; YKK Corporation, both of Tokyo, all of Japan

[21] Appl. No.: 331,093

[22] Filed: Oct. 28, 1994

[30] Foreign Application Priority Data

Oct. 29, 1993 [JP] Japan ................... 5-271907

[51] Int. Cl.$^6$ ................... B01J 23/38; B01J 23/89
[52] U.S. Cl. ................... 502/328; 502/326; 502/329; 502/330; 502/331
[58] Field of Search ................... 502/326, 328, 502/329, 330, 340, 344, 331, 332

[56] References Cited

U.S. PATENT DOCUMENTS

| | | | |
|---|---|---|---|
| 3,663,181 | 5/1972 | Shannon | 23/315 |
| 4,507,494 | 3/1985 | Miyazaki et al. | 560/193 |

FOREIGN PATENT DOCUMENTS

| | | | |
|---|---|---|---|
| 0397207 | 11/1990 | European Pat. Off. | B01J 23/74 |
| 54-11274 | 5/1954 | Japan | C01B 1/13 |
| 49-47281 | 5/1974 | Japan | C01B 3/32 |
| 57-56302 | 4/1982 | Japan | B01J 23/72 |
| 58-17836 | 2/1983 | Japan | B01J 23/76 |
| 58-166937 | 10/1983 | Japan | C01B 3/32 |
| 59-131501 | 7/1984 | Japan | C01B 3/32 |
| 60-77103 | 5/1985 | Japan | C01B 3/32 |
| 60-77104 | 5/1985 | Japan | C01B 3/32 |
| 60-87233 | 5/1985 | Japan | C07C 3/04 |
| 60-96504 | 5/1985 | Japan | C01B 3/32 |
| 2117366 | 10/1983 | United Kingdom | C01G 53/00 |

OTHER PUBLICATIONS

Patent Abstracts of Japan, vol. 009, No. 228, Sep. 13, 1985.
Patent Abstracts of Japan, vol. 009, No. 211, Aug. 29, 1985.

*Primary Examiner*—Glenn A. Caldarola
*Assistant Examiner*—Alexander G. Ghyka
*Attorney, Agent, or Firm*—Finnegan, Henderson, Farabow, Garrett & Dunner, L.L.P.

[57] ABSTRACT

A catalyst for methanol reforming which consists of an alloy represented by the general formula TM, wherein T is at least one element selected from the group consisting of Ti, Zr, Hf, Y, Nb and Zn; and M is at least one element selected from the group consisting of elements (Cu, Ag and Au) belonging to group IB of the periodic table and elements (Fe, Co, Ni, Ru, Rh, Pd, Os, Ir and Pt) belonging to group VIII of the periodic table, said alloy having a surface comprising an oxide including the element T and, dispersed therein, fine metal particles composed of the element M. The catalyst is produced by preparing an alloy having an amorphous phase and/or a microcrystalline phase from a molten composition of TM, and subsequently heating the alloy at 50° to 700° C. in an oxidizing atmosphere or an atmosphere like that in which methanol reforming is performed. Using the catalyst, methanol reforming can be efficiently performed at relatively low temperatures.

2 Claims, 1 Drawing Sheet

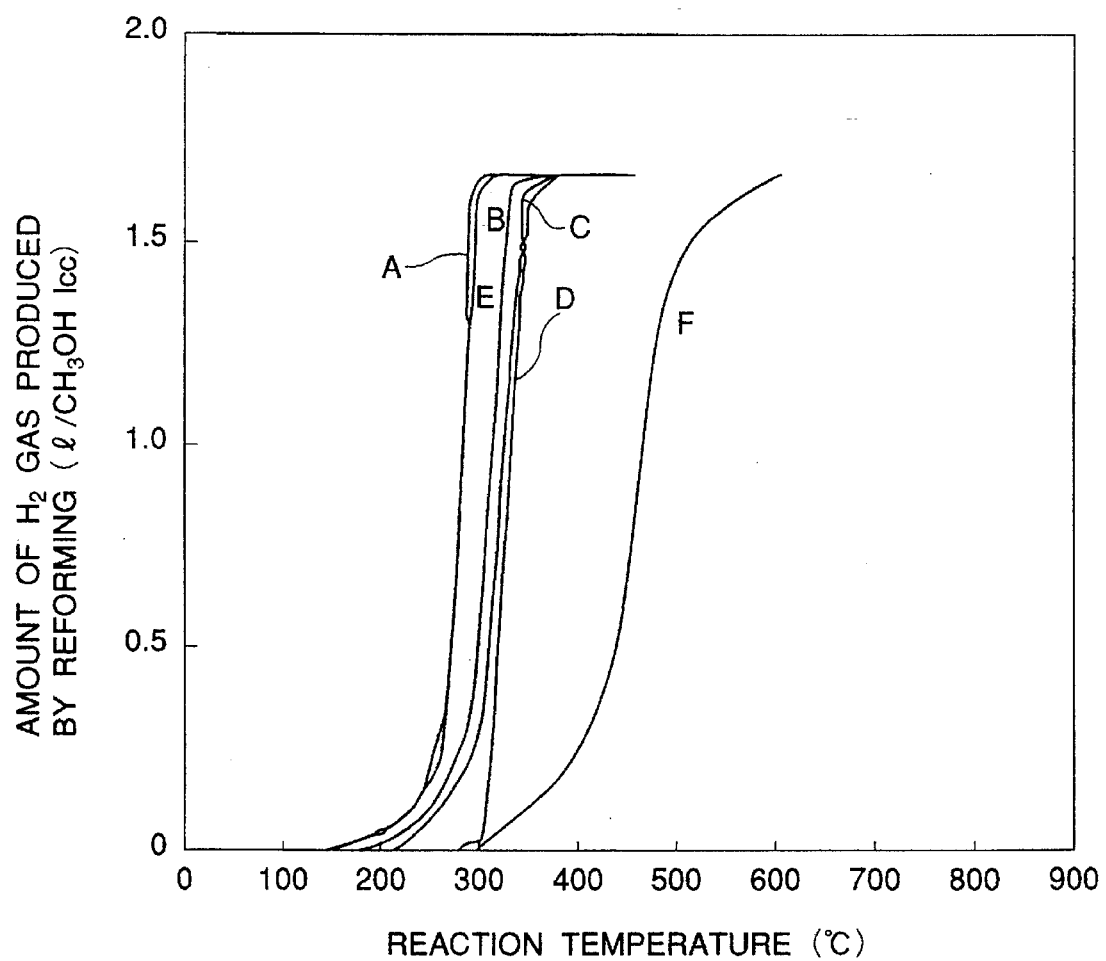

CATALYST FOR METHANOL REFORMING, PROCESS FOR PRODUCING THE SAME AND METHOD FOR REFORMING METHANOL

BACKGROUND OF THE INVENTION

1. Field of the Invention

The present invention relates to a methanol reforming catalyst for use in the production of hydrogen from methanol, a process for producing the same, and a method for reforming methanol.

2. Description of the Prior Art

The demand is increasing for a highly purified hydrogen gas to be used as, for example, an atmospheric gas for use in the production of semiconductors, and a fuel for use in a fuel cell, the future spread of which is anticipated. Accordingly, various hydrogen producing techniques have been developed. In particular, the technique in which methanol is cracked is drawing attention as a process for obtaining hydrogen on a small or medium scale in accordance with the above uses. This is because the technique for mass-producing methanol from a variety of resources such as petroleum, coal and natural gas has been established in recent years, so that it can be obtained at a lowered cost, and that methanol is safer than hydrogen gas in handling so as to facilitate its transportation and storage and to permit realization of a system for easily producing hydrogen.

Various catalysts for use in methanol reforming are known, including those disclosed in the specifications of Japanese Patent Application Laid-Open Nos. 47281/1974, 56302/1982, 17836/1983, 131501/1984, 96504/1985, 77103/1985 and 77104/1985 and Japanese Patent Publication No. 11274/1979. Further, a catalyst for use in cracking methanol to obtain hydrogen is disclosed in Japanese Patent Application Laid-Open No. 166937/1983. In addition, a process for producing methanol in the presence of an amorphous alloy as a catalyst is described in the specification of Japanese Patent Application Laid-Open No. 87233/1985.

All the above conventional methanol reforming catalysts do not always exhibit satisfactory performance in practical use. Further, the production of the catalysts has a problem in that the process is complicated and it is difficult to obtain high catalytic activities, because a metal salt or oxide is used as the starting material, so that a treatment comprising heating in an air stream containing hydrogen to reduce part of the metal oxide or hydroxide is essential for imparting a catalytic activity to the catalysts. In particular, the catalyst described in the specification of the Japanese Patent Laid-Open No. 166937/1983 is produced by a chemical process in which a metal salt is also employed as the starting material, thereby bringing about a drawback in that the process is time-consuming and complex.

SUMMARY OF THE INVENTION

Therefore, objects of the present invention are to provide a catalyst for methanol reforming which ensures complete cracking aid thus high catalytic activity at relatively low temperatures and a process for producing the catalyst, and to provide a method for reforming methanol which ensures efficient cracking at relatively low temperatures to thereby simplify the method.

In a primary aspect of the present invention, there is provided a catalyst for methanol reforming which consists of an alloy represented by the general formula TM, wherein T is at least one element selected from the group consisting of Ti, Zr, Hf, Y, Nb and Zn; and M is at least one element selected from the group consisting of elements (Cu, Ag and Au) belonging to group IB of the periodic table and elements (Fe, Co, Ni, Ru, Rh, Pd, Os, Ir and Pt) belonging to group VIII of the periodic table, the alloy having a surface comprising an oxide including the element T and, dispersed therein, fine metal particles composed of the element M. The elements T and M are preferably present in the alloy of the above general formula in atomic percentages of 10 to 85% and 90 to 15 atomic %, respectively. Further, the fine metal particles composed of the element M each preferably have a size ranging from subnanometers to several nanometers, especially from 2nm to 10 nm.

In a second aspect of the present invention, there is provided a process for producing a catalyst for methanol reforming which comprises preparing an alloy having an amorphous phase and/or a micro-crystalline phase from a molten composition of alloy represented by the above general formula; and subsequently heating the alloy at 50° to 700° C. in an oxidizing atmosphere or an atmosphere like that in which methanol reforming is performed, so that the above alloy has a surface comprising an oxide including the element T and, precipitated and dispersed therein, fine metal particles composed of the element M.

The third aspect of this invention is a method for reforming methanol in the presence of a catalyst represented by the above-defined general formula TM. In this method, a rapidly-solidified alloy of the general formula TM is introduced in a methanol reforming system and then methanol is introduced with or without steam into the system while heating the system at 150° to 500° C. so that the alloy is converted to a catalyst and the methanol reforming reaction is efficiently performed due to the presence of the catalyst.

BRIEF DESCRIPTION OF THE DRAWING

The single FIGURE is a graph which indicates the levels of the activities of the catalysts of the Examples according to the present invention and the Comparative Example.

DETAILED DESCRIPTION OF THE PREFERRED EMBODIMENTS

As described above, the inventive catalyst for methanol reforming consists of an alloy represented by the above-defined general formula TM in which the alloy has a surface layer comprising an oxide including the element T and, dispersed therein, fine metal particles composed of the element M. The surface layer can be obtained by combining the elements T and M indicated in the above general formula, melting to obtain a molten alloy and rapidly-solidifying the same to obtain an amorphous alloy, an alloy comprising a mixture of an amorphous phase and a micro-crystalline phase (alloy containing an amorphous phase) or an alloy comprising a microcrystalline phase, followed by appropriate heat treatment. The oxide including the element T is bound with the fine metal particles composed of the element M through strong interaction, so that the fine metal particles are stably fixed as they are to thereby exhibit high catalytic activities. Any element combinations other than the above combination of the elements T and M lead to poor catalytic activities even if the amorphous phase is used as a precursor.

With respect to preferred ranges of the contents of the elements T and M, it is around the eutectic point in the alloy phase diagram where an amorphous phase and a microcrystalline structure are most effectively obtained to thereby exhibit high catalytic activity. The contents of the elements T and M are preferably in the ranges of 10 to 85% and 15 to 90%, in atomic percentages, respectively. The presence of the elements T and M within these ranges strikingly realizes a structure in which fine metal particles are dispersed in an oxide exhibiting high activity. Particular examples of the element compositions of ZrAu, ZrCu, TiCu, HfCu, ZrCo and YNi alloys are $Zr_{bal}Au_{15-50}$, $Zr_{bal}Cu_{20-80}$, $Ti_{bal}Cu_{20-80}$, $Hf_{bal}Cu_{20-70}$, $Zr_{bal}Co_{20-90}$ and $Y_{bal}Ni_{20-60}$, respectively. Naturally, other element combinations would also have the same levels of content ranges.

It is preferred that the fine metal particles each have a size ranging from subnanometers to several nanometers, especially from 2 to 10 nm, as mentioned hereinbefore. If the size falls outside the above range, the catalytic activity would be somewhat lowered. Especially when the size is 5 nm or less, the catalytic effect would be strikingly improved.

The catalyst of the present invention may be employed in two types of reactions, namely, one according to the direct cracking method (1) in which methanol is directly cracked and the other according to the steam reforming method (2) in which hydrogen is produced from methanol and steam as indicated below.

$$CH_3OH \rightarrow 2H_2 + CO \tag{1}$$

$$CH_3OH + H_2O \rightarrow 3H_2 + CO_2 \tag{2}$$

In the production of the inventive alloy catalyst, an alloy having an amorphous phase and/or a microcrystalline phase is prepared from a molten composition of alloy represented by the above general formula. As production processes of the alloy, there may be mentioned various processes such as a liquid quenching process in which a molten metal is rapidly solidified at a cooling rate as rapid as $10^4$ to $10^6$ K/s, an in-water melt-spinning process, an MA (mechanical alloying) process, a sputtering process and a plating process. When the alloy is prepared as powder, for example, by atomizing, the quenching may be suitably effected at a rate of at least $10^2$ K/s.

The thus obtained alloy having an amorphous phase and/or a microcrystalline phase is subsequently exposed to an oxidizing atmosphere, an atmosphere suitable for methanol reforming or an atmosphere like the same. The exposure oxidizes the surface layer of the alloy to generate the state in which fine metal particles composed of the element M and each having a size ranging from subnanometers to several nanometers are dispersed in an oxide of the element T, so that the alloy exhibits high catalytic activity. It is requisite that the alloy be heated at 50° to 700° C. for preparing the catalyst having fine metal particles dispersed in an oxide as mentioned above. That is, this type of catalyst is classified into a group oriented to activity exhibition at low temperatures and a group oriented to activity exhibition at high temperatures, for example, the use thereof in combination with a molten carbonate salt fuel cell, and thus the heating temperature is limited to 50°–700° C. for meeting the requirements of these two groups and the requirement intermediate therebetween.

In the production process of the inventive catalyst, the starting alloy having an amorphous phase and/or a microcrystalline phase may be treated in an atmosphere comparable to that for methanol reforming. Thus, if the starting alloy is introduced in the methanol reforming process and a methanol reforming reaction is immediately initiated, the starting alloy would first be converted to a catalyst and then contribute to the methanol reforming reaction as the catalyst. Therefore, it is preferred that the heating temperature be in the range of 150° to 500° C. This provides a method for reforming methanol according to a third aspect of the present invention.

In this method, the reaction starts at about 150° C. and the hydrogen yield reaches 100% relative to the quantity of fed methanol at 300° to 500° C. by the activity of the catalyst.

The present invention will now be described in greater detail with reference to the following Examples.

EXAMPLE 1

An alloy of $Au_{30}Zr_{70}$ was prepared by the use of an arc melting furnace. The alloy was inserted into a silica tube having a small opening at its tip, and heated to melt the alloy. The silica tube was placed just above a 200-mm roll, and the molten alloy was injected through the small opening of the silica tube under an argon pressure of 0.7 kg/cm$^2$ while rotating the roll at a speed as high as 4000 rpm so as to cause the injected alloy to contact the roll surface, thereby effecting rapid solidification of the alloy. Thus, a thin ribbon having a width of about 1 mm was obtained. The above cooling rate was $10^5$ K/s. A catalytic reaction test was carried out in a tubular fixed bed flow reactor in which the above thin ribbon was placed. The thin ribbon was packed in an amount of 0.1 g and converted to a catalyst, and methanol cracking was performed while passing a mixture of methanol and steam through the thin ribbon packed in the form of a layer by the use of nitrogen gas as a carrier. The composition of formed gas was analyzed by gas chromatography, thereby determining the catalytic activity of the alloy. The performance thereof is shown in FIG. 1 as curve A.

EXAMPLE 2

A thin ribbon was prepared from an alloy of $Cu_{60}Zr_{40}$ in the same manner as in Example 1. The performance thereof as a catalyst is shown in FIG. 1 as curve B.

EXAMPLE 3

A thin ribbon was prepared from an alloy of $Ni_{60}Zr_{40}$ in the same manner as in Example 1. The performance thereof as a catalyst is shown in FIG. 1 as curve C.

EXAMPLE 4

A thin ribbon was prepared from an alloy of $Co_{40}Zr_{60}$ in the same manner as in Example 1. The performance thereof as a catalyst is shown in FIG. 1 as curve D.

EXAMPLE 5

A thin ribbon was prepared from an alloy of $Ag_{30}Y_{70}$ in the same manner as in Example 1. The performance thereof as a catalyst is shown in FIG. 1 as curve E.

Comparative Example

The performance of the conventional catalyst of Pt(1 wt %)–Al$_2$O$_3$ is shown in FIG. 1 as curve F.

As apparent from the above, the yield reaches 100% at lower temperatures in Examples 1 to 5 according to the present invention than in the Comparative Example. Further, the reproducibility of the catalytic activity and the durability of the catalysts of the present invention are also satisfactory.

The respective temperatures at which the cracking starts and at which the yield reaches 100% are collectively shown in Table 1 for the catalysts of the above Examples and Comparative Example together with those for other separately produced catalysts.

TABLE 1

| Composition | Temp. at which reforming starts | Temp. at which yield reaches 100% |
|---|---|---|
| $Au_{30}Zr_{70}$ | 150° C. | 270° C. |
| $Cu_{60}Zr_{40}$ | 190° C. | 330° C. |
| $Ni_{60}Zr_{40}$ | 220° C. | 335° C. |
| $Co_{40}Zr_{60}$ | 280° C. | 360° C. |
| $Ag_{30}Y_{70}$ | 155° C. | 270° C. |
| $Pt_{10}Y_{90}$ | 140° C. | 260° C. |
| $Rh_{20}Y_{80}$ | 150° C. | 270° C. |
| $Pd_{30}Y_{70}$ | 140° C. | 260° C. |
| $Cu_{30}Y_{70}$ | 170° C. | 290° C. |
| $Pt_{15}Ti_{85}$ | 190° C. | 300° C. |
| $Pd_{30}Ti_{70}$ | 185° C. | 290° C. |
| $Cu_{30}Ti_{70}$ | 190° C. | 350° C. |
| $Cu_{40}Hf_{60}$ | 180° C. | 300° C. |
| $Au_{45}Hf_{55}$ | 160° C. | 300° C. |
| $Ni_{30}Zn_{70}$ | 200° C. | 330° C. |
| $Au_{25}Cu_{5}Zr_{70}$ | 150° C. | 280° C. |
| $Au_{25}Fe_{5}Zr_{70}$ | 165° C. | 300° C. |
| $Cu_{45}Ag_{5}Ti_{50}$ | 190° C. | 340° C. |
| Comp. Ex Pt(1 wt %)$Al_2O_3$ | 300° C. | 600° C. |

The catalyst for methanol reforming according to the present invention exhibits high catalytic activity at relatively low temperatures. Further, the process of the present invention produces an active catalyst through a simplified procedure. Still further, the method for reforming methanol according to the present invention produces hydrogen through effective methanol cracking at relatively low temperatures. In this method, the catalyst activation may precede the reforming operation to thereby simplify the process itself.

What is claimed is:

1. A catalyst for methanol reforming which consists of an alloy consisting of the general formula TM, wherein T is at least one element selected from the group consisting of Ti, Zr, Hf, Y, Nb and Zn; and M is at least one element selected from the group consisting of Cu, Ag, Au, Fe, Co, Ni, Ru, Rh, Pd, Os, Ir and Pt, said alloy having a surface comprising an oxide including the element T and, dispersed in the oxide, a plurality of fine metal particles composed of the element M, said fine metal particles composed of the element M having a size ranging from subnanometers to several nanometers, and the elements T and M being present in the alloy TM in atomic percentages of 10 to 85% and 90 to 15%, respectively.

2. A process for producing a catalyst for methanol reforming which comprises preparing an alloy having an amorphous phase and/or a microcrystalline phase from a molten composition consisting of the general formula TM, wherein T is at least one element selected from the group consisting of Ti, Zr, Hf, Y, Nb and Zn; and M is at least one element selected from the group consisting of Cu, Ag, Au Fe, Co, Ni, Ru, Rh, Pd, Os, Ir and Pt, and subsequently heating the alloy at 50° to 700° C. in an oxidizing atmosphere or an atmosphere equivalent to that in which a methanol reforming is performed, so that said alloy has a surface comprising an oxide including the element T and, precipitated and dispersed in the oxide, a plurality of fine metal particles composed of the element M, said fine metal particles composed of the element M having a size ranging from subnanometers to several nanometers, and the elements T and M being present in the alloy TM in atomic percentages of 10 to 85% and 90 to 15%, respectively.

* * * * *